United States Patent [19]
Robertson

[11] 3,811,303
[45] May 21, 1974

[54] PROTECTIVE GUARD FOR THE IGNITION SWITCH OF A MOTOR VEHICLE

[76] Inventor: Glynn C. Robertson, 4555 S. Federal St., Apt. 306, Chicago, Ill. 60609

[22] Filed: Jan. 12, 1973

[21] Appl. No.: 323,106

[52] U.S. Cl.......................... 70/237, 70/18, 200/44, 200/61.54
[51] Int. Cl.......................... B60r 25/00, H01h 9/28
[58] Field of Search....... 70/18, 158, 163, 164, 166, 70/167, 209, 211, 212, 237, 423, 424, 425, 426, 427, 428; 200/44, 45, 61.54

[56] References Cited
UNITED STATES PATENTS

| | | |
|---|---|---|
| 1,530,814 | 3/1925 | Credle .................................. 70/178 |
| 3,665,738 | 5/1972 | Pescuma et al...................... 70/211 |
| 1,590,981 | 6/1926 | Lockyer............................... 70/237 |
| 3,401,543 | 9/1968 | Lewis................................... 70/183 |

Primary Examiner—Albert G. Craig, Jr.
Attorney, Agent, or Firm—Max R. Kraus

[57] ABSTRACT

A protective guard for the ignition switch of a motor vehicle comprising a pair of members which are hingedly secured together so that they may be opened and closed with respect to the steering column of a motor vehicle and positioned around the steering column adjacent the ignition switch with one of said members having a housing surrounding the ignition switch, and means for locking the pair of members around said steering column to provide a protective guard and prevent unauthorized access to the ignition switch.

3 Claims, 7 Drawing Figures

PATENTED MAY 21 1974

3,811,303

PROTECTIVE GUARD FOR THE IGNITION SWITCH OF A MOTOR VEHICLE

BRIEF SUMMARY OF THE INVENTION

It is recognized that the theft of motor vehicles is increasing at an alarming rate and that when a thief gains access into a vehicle the ignition switch on the steering column is accessible so that by inserting a key therein the vehicle can be operated. One of the objects of this invention is to provide a protective guard which is positionable around the steering column and completely encloses and encases the ignition switch, with said protective guard being locked so that even if a thief gains access into the car he cannot start it as he would be prevented from doing so by the locked protective guard which forms this invention.

When the ignition switch is locked, the steering wheel and the transmission is likewise locked against operation. Thus, even if a thief opens the hood of the car and starts it he cannot operate the car unless he is able to gain access to the ignition switch and with this invention such access is made virtually impossible.

Another object of this invention is to provide a protective guard which fits around the ignition switch and the adjacent part of the steering column and is locked in such protective position so that the switch is protected from unauthorized use, yet the protective guard may be either detached or removed from the steering column or slid down on said column in an out-of-the-way position by an authorized person.

BRIEF DESCRIPTION OF THE DRAWINGS

In the drawings:

FIGS. 1 TO 4 INCLUSIVE

Figure 1:
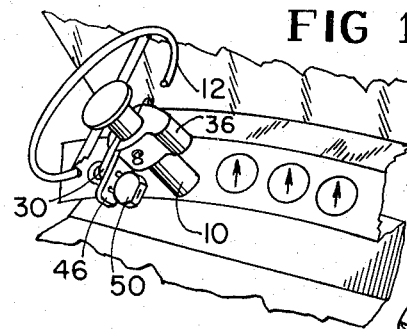
FIG. 1 is a perspective view showing a conventional steering column and the dashboard portion of an automobile with one embodiment of the protective guard positioned around the steering column and the ignition switch to lock the same against unauthorized access.
Figure 2:
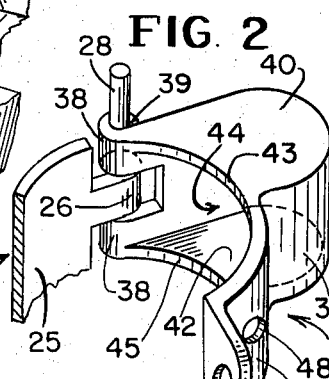
FIG. 2 is a fragmentary perspective of the protective guard.

The embodiment shown in FIGS. 1 to 4 inclusive will be first described. The conventional dashboard and steering column and steering wheel is illustrated in FIG. 1, with the steering column indicated at 10, the steering wheel indicated at 12, the ignition switch on said steering column indicated at 14, the flasher button indicated at 16 and the directional lever indicated at 18. The foregoing is conventional.

The invention herein comprises the protective guard made preferably of metal or as a metal casting and generally indicated at 20, which is formed of a pair of members 22 and 24 hingedly secured together at their rear and locked at their front. The member 22 has a semi-circular shaped side wall or body 25 shaped to conform to the shape of the steering column. Said side wall or body has an outwardly extending hinge extension 26 at the rear provided with a vertical bore for receiving a hinge pin 28. Extending forwardly of the front of the side wall or body 25 is a locking lug 30 having a single transverse opening 31. The side wall or body 25 has an opening 32 extending from the top edge of the side wall to accommodate the directional lever 18.

The member 24 comprises an arcuate-shaped front side wall section 34 which continues as a curved lateral extending side wall 36 which is of generally U-shaped configuration. The laterally extending side wall 36 continues rearwardly and terminates in the rear with a pair of spaced hinge ears 38 which have vertical openings 39. The spaced hinge ears 38 are alined with the rear hinge extension 26 and extend above and below the hinge extension 26. A hinge pin 28 is received in said openings and locks the two guard members 22 and 24 together for hinging action.

The laterally extending side wall 36 of the guard member 24 is closed at the top and bottom by a horizontal top wall 40 and a bottom wall 42 and which forms with said laterally extending side wall 36 a housing generally indicated at 44 which, when the protective guard is attached around the steering column, completely enclosed and encases the ignition switch 14 therewithin. The inner edges 43 and 45 of the top and bottom horizontal walls 40 and 42 are curvilinear and in effect form with the arcuate front side wall 34 a semi-circular shape to conform to the curvature of the steering column. Extending forwardly of the arcuate front side wall 34 is the other locking lug 46 having a pair of spaced transverse openings 47 and 47a, the opening 47 being alined with the opening 31 in the locking lug 30. The locking lug 46 has a greater height than the locking lug 30 to permit the hasp of the padlock to engage both lugs. The arcuate side wall 34 has an opening 48 to accommodate the flasher button 16.

To protect the ignition switch against unauthorized use, the protective guard unit 20 is positioned around the steering column 10, with the housing portion 44 adjacent the ignition switch 14. The two guard members 22 and 24 can be positioned by hinging them to an open position so that the opening 32 in member 22 accommodates the directional lever 18 so that it passes through and then the other guard member 24 is positioned so that the opening 48 passes over the flasher button 16.

The fronts of the two guard members 22 and 24 are closed or brought together so that the locking lugs 30 and 46 are adjacent each other, with the opening 31 alined with opening 47. They are locked together by the hasp 49 of the padlock 50. The padlock is conventional and when the hasp is opened the open end of the hasp is inserted through the alined openings 31 and 47 and the open end of the hasp is then passed through the opening 47a and locked to the padlock. This positions the padlock and its hasp in a horizontal position relative to the guard and to the front of the guard. By having locking lug 30 with one opening 31 shorter than locking lug 46 with the two openings, it is possible to insert the hasp in the alined openings and manipulate it so that it enters the bottom opening 47a to permit it to be locked to the padlock. The padlock is opened by a key which is different from the key which opens the vehicle door.

When the car is to be operated by an authorized person, the protective guard 20 is either entirely removed from the steering column by unlocking the padlock and hinging the two guard members 22 and 24 to open position so that they clear the flasher button and directional lever and ignition switch, after which the unit is removed and placed either in the glove compartment or on the seat, or the protective guard may be opened as described and, clearing the flasher button, directional lever and switch, it may be slid downwardly and retained on the steering column for subsequent use, thus being readily available.

When in locked position the housing 44 will completely enclose and encase the ignition switch 14. Thus, when the unit is in the position shown in FIGS. 1–4 it completely blocks and locks any access to the ignition switch and the vehicle cannot be operated until the protective guard is removed. As long as access to the ignition switch is blocked the vehicle cannot be operated since a locked ignition switch also locks the steering wheel and the transmission and even if the motor was started through access to the hood, the vehicle would still remain inoperable. The likelihood of a thief after gaining access to the car having an appropriate key for opening the padlock which requires another type of key is rather remote. Even if it were possible, the time factor in trying to open a padlock with another type of key would be such as to deter the thief who would want to make a fast get-away.

Figure 5:
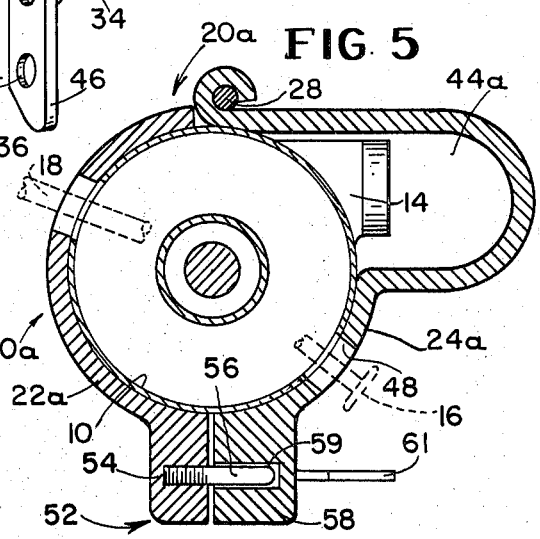
FIG. 5 is a sectional view taken on line 5—5 of FIG. 6 of a modified protective guard in which the locking means are integrated with the protective guard.
Figure 4:
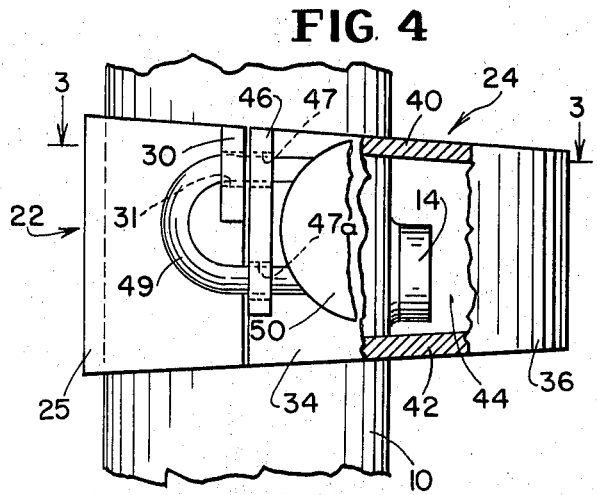
FIG. 4 is a front elevational view with a portion of the protective guard broken away and showing same positioned on the steering column.
Figure 6:
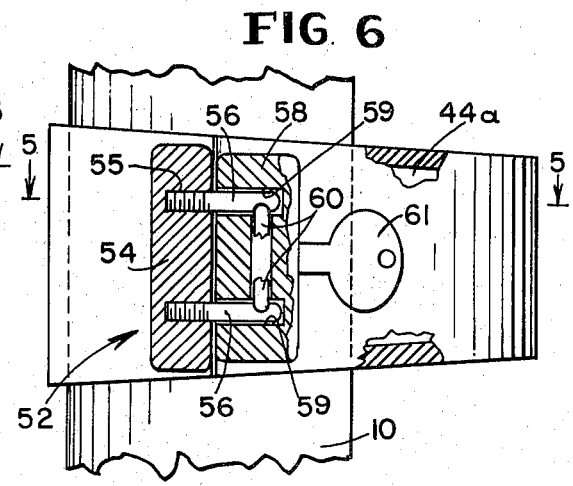
FIG. 6 is a front elevational view partly in section of the protective guard shown in FIG. 5.

FIGS. 5 and 6

FIGS. 5 and 6 show a modification in which the protective guard 20a comprises two members 22a and 24a shaped similar to that previously described and hinged at the rear, with the member 24a having a housing 44a for enclosing the ignition switch 14. In this modification the locking means generally indicated at 52 is integrated with the two members 22a and 24a and thereby eliminates the use of a separate padlock such as shown in the previous embodiment. In the FIGS. 5 and 6 modification the locking lug 54 extending forwardly of member 22a has a pair of spaced internally threaded bores 55 to threadedly receive the locking bolts 56. The locking lug 58 extending forwardly of member 24a is provided with spaced sockets 59 to receive the locking bolts 56. Said lug 58 supports a lock with retractable tumblers 60 positioned therein which are operated by a key 61. The tumblers 60 engage the locking bolts 56 for locking the two members 22a and 24a together.

FIG. 7

Figure 7:
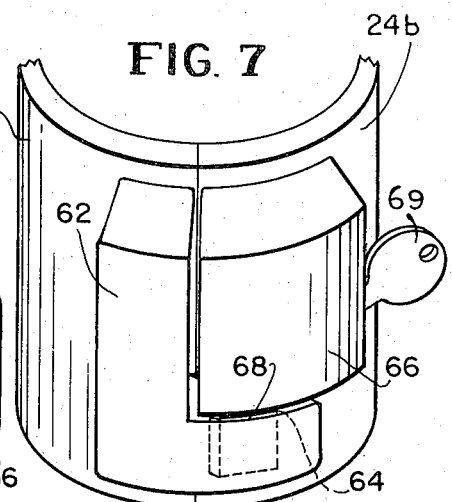
FIG. 7 is a front partial view of a protective guard with a further modified locking means.
Figure 3:
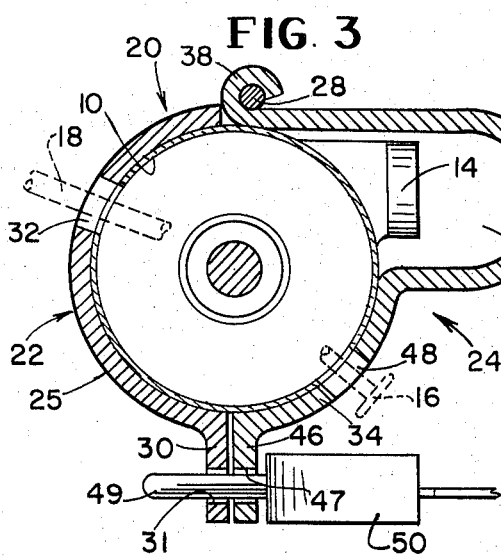
FIG. 3 is a central sectional view taken on line 3—3 of FIG. 4 showing the protective guard of this invention in the locked position around the steering column.

In the FIG. 7 embodiment the two guard members 22b and 24b are formed as previously described, except that at the front thereof the member 22b has an L-shaped extension 62 extending forwardly of the side wall of said member, with the bottom portion having a recess or opening 64, and the other guard member 24b having a forward extension 66 configured to accommodate in overlapping relation the L-shaped extension 62. Said forward extension 66 supports therewithin a locking member having a retractable locking bolt 68 operated by a key 69, which bolt extends into the opening or recess 64 for locking. In this embodiment the locking mechanism is integrated with the guard members 22b and 24b as is true with the FIGS. 5 and 6 embodiment.

What is claimed is:

1. A protective guard for the ignition switch on the steering column of a motor vehicle, said protective guard comprising a pair of members which are hingedly secured together so that they may be opened and closed with respect to the steering column and positionable around the steering column adjacent the ignition switch, with one of said members having a housing surrounding said ignition switch, one of said members having a forwardly extending lug with one opening and the other member having a forwardly extending lug of a greater height and having a pair of spaced openings and in which the hasp of a padlock passes through said openings for locking said pair of members with said hasp and padlock being horizontally positioned at the front of said pair of members for locking said protective guard so that unauthorized access to said ignition switch is prevented.

2. A protective guard for the ignition switch on the steering column of a motor vehicle, said protective guard comprising a pair of members hingedly secured together and positionable around the steering column adjacent the ignition switch so that they may be opened and closed with respect to the steering column, with one of said members having a housing surrounding said ignition switch, each of said members having an extension and in which one of said extensions is of a generally L-shaped configuration with the other extension being shaped complementary thereto for interfitting relation and in which said extensions contain a locking mechanism for locking said protective guard so that unauthorized access to said ignition switch is prevented.

3. A protective guard for the ignition switch on the steering column of a motor vehicle, said protective guard comprising a pair of members which are hingedly secured together so that they may be opened and closed with respect to the steering column and positionable around the steering column adjacent the ignition switch, one of said members having a semi-circular side wall, the other of said members having an arcuate front side wall and a laterally extending housing which comprises a U-shaped side wall and top and bottom walls, with said top and bottom walls being curvilinear and continuations of the arcuate front side wall, said housing adapted to completely encase the ignition switch when said protective guard is positioned on said steering column in protective position, each of said pair of members having forward extensions and locking means associated with said forward extensions for locking said protective guard so that unauthorized access to said ignition switch is prevented.

* * * * *